No. 623,529. Patented Apr. 25, 1899.
T. DUNCAN.
ELECTRIC METER.
(Application filed Aug. 8, 1898.)

(No Model.) 2 Sheets—Sheet 1.

Witnesses
Samuel R. Bachtel
Adelaide Kerams

Thomas Duncan Inventor
By his Attorneys Chapin & Denny

No. 623,529. Patented Apr. 25, 1899.
T. DUNCAN.
ELECTRIC METER.
(Application filed Aug. 8, 1898.)
(No Model.)
2 Sheets—Sheet 2.
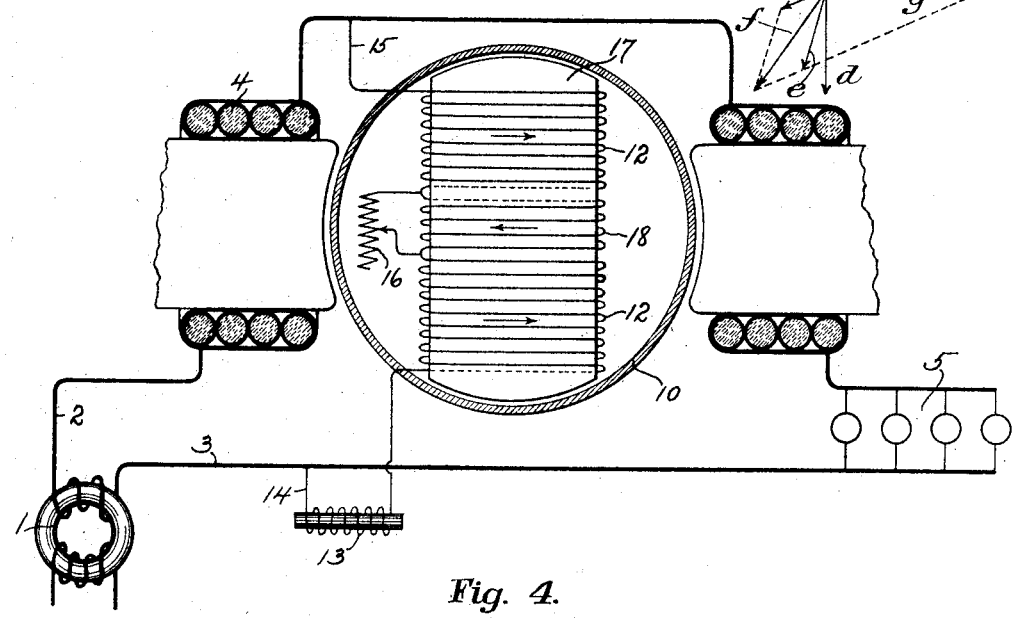
Fig. 3.
Fig. 5.
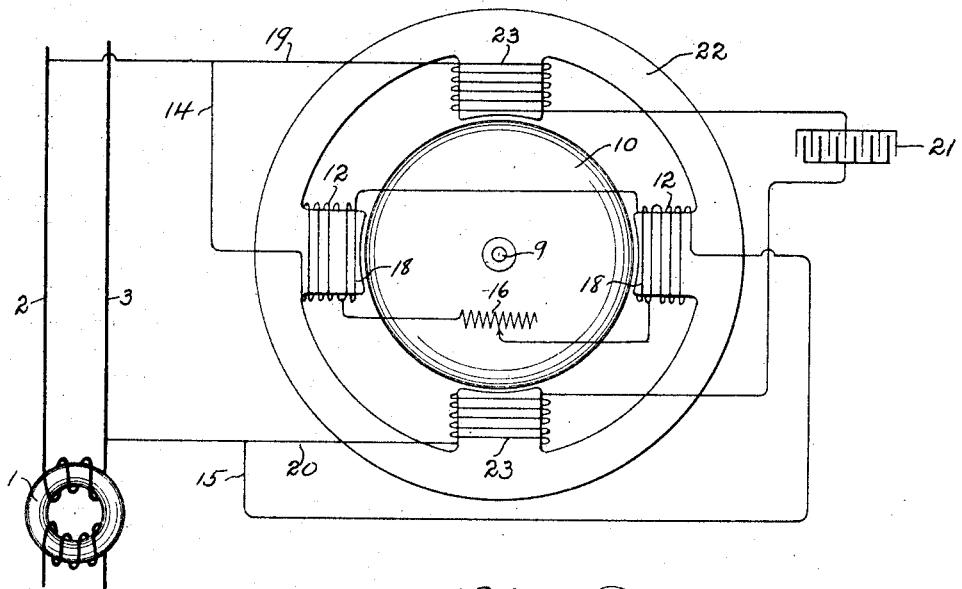
Fig. 4.
Witnesses
Samuel R. Bachtel
Adelaide Kearns
Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 623,529, dated April 25, 1899.

Application filed August 8, 1898. Serial No. 688,045. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

The present invention relates to improvements in induction-motor meters.

The object of my improvement is to provide a means for causing the magnetism of the volt-coil to lag a quarter-period or ninety degrees behind the electromotive force represented by the said magnetism. This is now known to be a requisite condition in meters of this class to enable them to measure the actual or true watts in circuits supplying current to inductive translating devices, such as motors and arc-lamps.

Figure 1:
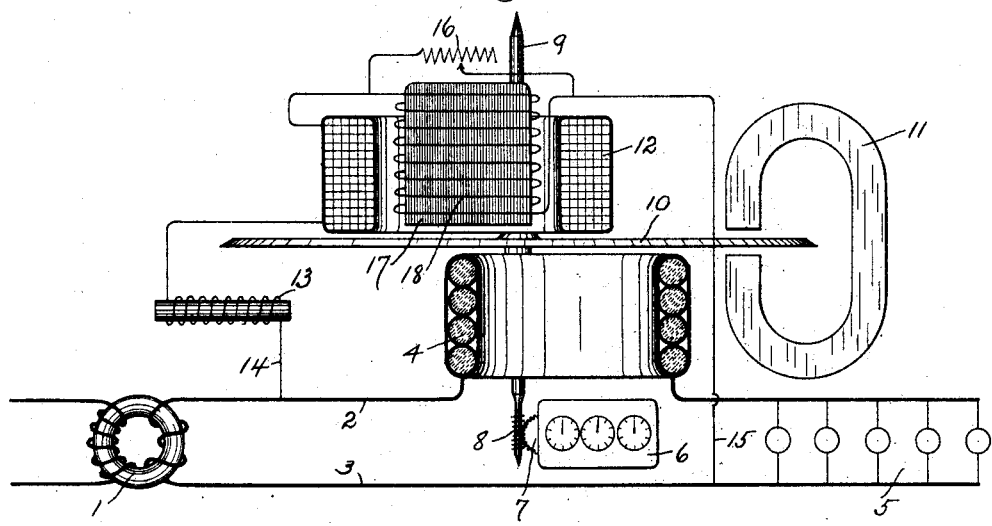
Figure 2:
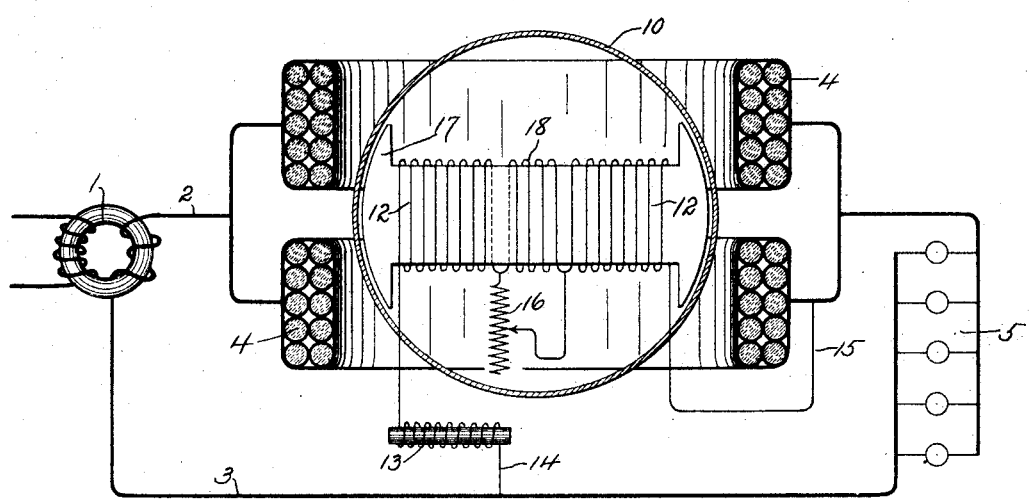

In the accompanying drawings, in which similar reference letters and numerals designate like parts, Figure 1 is a front elevation of my improvement, showing the relative arrangement of the operative parts with the series and volt-coils shown in vertical central section. Fig. 2 is a plan of the motor portion with the series field-coils and the cylindrical armature shown in horizontal section. Fig. 3 is also a plan view showing the series field-coils and the cylindrical armature in horizontal section with the volt-coil mounted or wound upon a straight iron core and arranged within the said armature. Fig. 4 illustrates the application of my improvement to a two-phase motor operated from a single-phase source of current hereinafter described. Fig. 5 shows by a vector diagram the phase relations and magnitudes of the currents which are operative in producing the ninety-degree lag of the magnetism representing the electromotive force.

It is well known that the employment of fan-motors by most users of electric incandescent lights has rendered it desirable and necessary that induction-motor meters be able to measure the true energy or watts with lagging currents. I am aware that a variety of complicated and unreliable devices have been provided for the accomplishment of this object, and my present invention has for one of its objects the obviating of these defects.

It is an indispensable requisite to a meter of the class described or one capable of measuring inductive loads that the magnetism representing the electromotive force in volts be in quadrature or removed ninety degrees from the said electromotive force and also removed the same number of degrees from the current in the work-circuit and its magnetism when the translating devices are non-inductive.

With special reference to Fig. 1 the transformer 1, with its leads 2 and 3, supply current to the translating devices 5. A series or ampere coil 4 is included in one of the leads 2, so that all the current passes through this coil and represents the said current by the strength or density of its magnetism. A second field-coil 12, herein called the "volt-coil," is suitably arranged in eccentric relation with the said coil 4 and receives its current in multiple from the leads 2 and 3 by means of the connecting-wires 14 and 15. The volt-coil 12 being in multiple adapts it to be traversed by a current with its resulting magnetism, that varies directly as the electromotive force or volts between the said leads 2 and 3. To assist the current through the volt-coil 12 to lag the required ninety degrees behind the pressure, I employ any suitable form of impedance-coil 13 in series therewith, and since for reasons now well known in the art the impedance-coil alone cannot produce a lag of ninety degrees I obtain the desired lag which has been experimentally demonstrated by taking a minor portion of the turns or convolutions 18 of the volt-coil 12 and causing them to oppose the major portion of the said turns by winding them in the opposite direction, and then shunting a variable resistance 16 around the terminals of the said minor opposing turns I readily obtain a resultant magnetic field through the coil 12, which is exactly in quadrature with the electromotive force, or which lags ninety degrees behind, as required.

The object in having the portion 18 of the coil 12 wound in a reverse direction is to increase the efficiency of the shunt-circuit by reducing the current and energy passing through it in the following manner: Suppose, for example, that the current through the coil 12 was one-tenth of an ampere and the turns one thousand. The ampere-turns would be one-tenth multiplied by one thousand, or one hundred ampere-turns. Now if the portion 18 comprises, say, one hundred turns, and has to set up a counter or lagging magnetization of ten ampere-turns its current would have to be also one-tenth of an ampere; but the coil 12 with its current of one-tenth of an ampere would neutralize the secondary current of one-tenth of an ampere in the portion 18 due to their flowing in opposite directions. Therefore by reversing the turns, so that the secondary current generated in the portion 18 will be approximately in the same direction as the current of the coil 12 through the portion 18, they combine their currents, as shown by the resultant line $f$ in Fig. 5.

From the foregoing it is obvious that if the portion 18 was not reversed the resistance 16 would have to be reduced until the current through the portion 18 was double or one-fifth of an ampere—i. e., one-tenth of an ampere to overcome the counter-current in the coil 12 and one-tenth to produce its own lagging field.

In Fig. 5 the line $a$ represents the impressed electromotive force, the line $b$ represents the current through the coil 12, the line $c$ the current through the portion 18 reversed, the line $d$ the secondary electromotive force developed in the portion 18 by the magnetism of the coil 12, the line $e$ the secondary current resulting from the electromotive force $d$, the line $f$ represents the resultant current of the lines $c$ and $e$, and the line $g$ is the magnetic resultant of the line $b$ and the resultant line $f$. In other words, the magnetism $g$, representing the line-pressure $a$, is in quadrature with the latter and is the resultant of the current and magnetism $b$ of the coil 12 and the resultant $f$ of the currents and magnetisms $c$ and $e$ of the portion 18.

Having established magnetic quadrature of the coil 12, the meter will accurately measure the true energy with any lagging current or angle of lag in the coil 4, and when said angle of lag reaches ninety degrees the magnetism of both the coils 4 and 12 will be in phase, whereupon the meter will stop on account of the energy being zero. A laminated iron core 17 is shown arranged inside of the coil 12; but this core may be dispensed with or omitted without impairing the operativeness of my invention. The oppositely-wound portion 18 of the volt-coil 12 may be arranged upon the iron core 17, or it may be placed upon either the outer or inner diameter of the coil 12, or it may be even sandwiched within the major portion of the windings, as shown in Fig. 3. Midway of the coils 4 and 12 and in inductive relation therewith is arranged a revoluble aluminium disk armature 10, mounted upon a proper spindle 9. This spindle carries a worm 8, that meshes with a worm-wheel 7, which in turn forms an actuating engagement with a proper registering-train 6 in any well-understood manner.

A portion of the disk armature 10 is embraced between the poles of a permanent magnet 11 for the well-known purpose of creating a drag to make the speed of the meter proportional to the energy passing through it.

In Fig. 2 is shown a modified type of meter employing my invention, and consists of two series coils 4 in parallel to each other and embracing the cylindrical armature. The phase-changing portion 18 of the volt-coil 12 is wound upon the center of the core 17 and has the turns comprising the portion 12 at each side thereof.

Fig. 3 shows the direction of the current through the coil 12 and its phase-changing or minor portion 18 by means of the arrows.

In Fig. 4 a motor consisting of four pole-pieces is shown, by which my invention is utilized for the purpose of obtaining two magnetic fields that are in quadrature with each other and is operated from a single-phase source of alternating currents. The two pole-pieces situated at the top and bottom of the frame 22 have a coil 23 placed upon each and in series with a suitable condenser 21. The terminals 19 and 20 of these coils 23 are connected to the leads 2 and 3 in multiple. The condenser 21 is so adjusted that its capacity exactly neutralizes the inductance of the coils 23, thereby permitting the current energizing them to be in phase with the electromotive force of the leads 2 and 3. The lagging field is set up at the two poles in the horizontal and upon which the coils 12 are mounted. The inductance of these coils 12 are adjusted to exact quadrature or ninety degrees by adjusting the resistance 16 and allowing more or less current to traverse the oppositely-wound or phase-changing portion 18 of the coils 12.

What I desire to secure by Letters Patent is—

1. In an induction-motor meter, the combination of a series coil; a volt-coil having a portion of its turns wound in a reverse direction to the balance of its turns; a variable resistance shunted around the said reversed portion of the volt-coil; an impedance-coil in series with the said volt-coil; and a revoluble metallic armature in inductive relation to the said series and volt coils.

2. In an induction-motor meter, a series coil or coils; a volt-coil having a minor portion of its turns magnetically opposing the major portion thereof; a resistance shunted around the terminals of said minor portion or turns, for the purpose specified; a revoluble closed circuited armature in inductive relation to the said series and volt coils; and an impedance-coil in series with the said volt-coil.

3. In an induction-motor meter, a series field-coil 4; a volt-coil 12 having a portion of its convolutions reversely arranged and adapted to set up a counter magneto-motive force to the remaining turns of said volt-coil; a resistance 16 in multiple to the oppositely-wound portion 18; an impedance-coil 13 in series with said volt-coil; and a revoluble armature in inductive relation to the said series and volt coils.

4. In an induction-motor meter, the combination of a series coil; a volt-coil consisting of two windings in series with each other, one of which is wound in a reverse direction to the other and has a resistance in multiple thereto; an iron core in coöperative relation with the said volt-coil; an impedance-coil in series with the said volt-coil; a revoluble armature in inductive relation to the said series and volt coils; a magneto-electric drag; and a suitable registering mechanism for indicating the revolutions of said armature.

Signed by me, at Fort Wayne, county of Allen, State of Indiana, this 4th day of August, A. D. 1898.

THOMAS DUNCAN.

Witnesses:
 ADELAIDE KEARNS,
 ROSE N. STARKEL.